Dec. 11, 1956   R. B. MICHAEL   2,773,477
VETERINARY TABLE
Filed Dec. 2, 1955
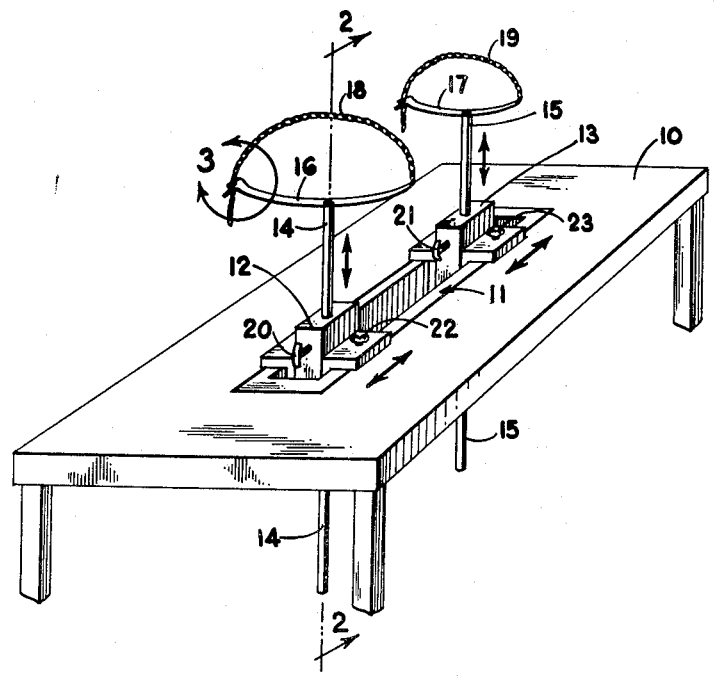
Fig.1
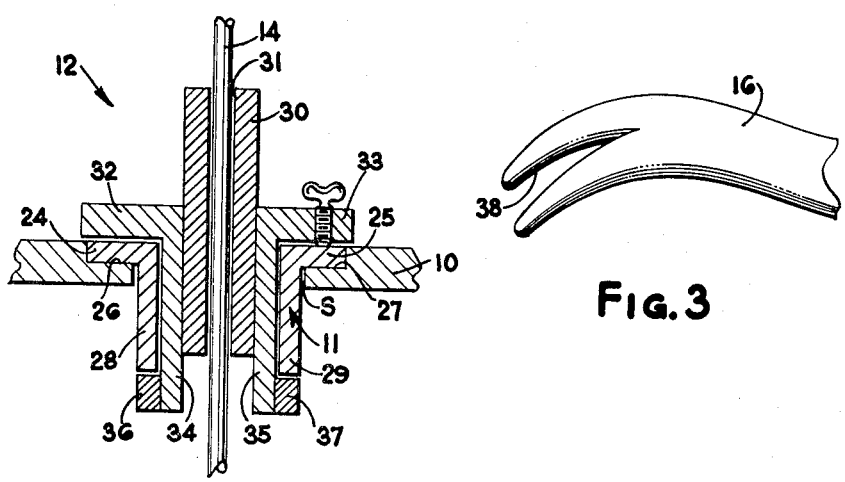
Fig. 2
Fig. 3
INVENTOR.
ROBERT B. MICHAEL
BY Elliott & Pastoriza
ATTORNEYS

United States Patent Office 2,773,477
Patented Dec. 11, 1956

2,773,477

VETERINARY TABLE

Robert B. Michael, Culver City, Calif.

Application December 2, 1955, Serial No. 550,596

4 Claims. (Cl. 119—103)

This invention relates generally to veterinary apparatus, and more particularly to an improved veterinary table for holding animals, preferably in a standing position.

A predominant proportion of a veterinarian's time is devoted to the general treatment and examination of domestic animals and includes, for example, such functions as the washing and trimming, the treatment of skin diseases and the subjection of such animals to medicinal preparations. For these purposes, it is desirable to hold an animal such as a dog, for example, in its normal upright position. Most animals will not retain such a position voluntarily, and dogs particularly have a tendency to sit, move and squirm about, or lie down when placed on a table.

Heretofore, various devices in the form of overhead slings, and the like have been proposed for holding animals in upright positions on a table surface. One of the difficulties with such devices is their tendency to swing if the animal lifts its legs from the table. Further, overhead harness structures prevent easy access to certain areas of the animal, in that the upwardly extending harness tends to obstruct the veterinarian conveniently working on the upper extremities of the animal.

It is a primary object of the present invention accordingly, to provide an improved veterinary table including means for holding an animal in its normal upright position and maintaining it in such position notwithstanding the tendency of the animal to withdraw its legs from the table surface, whereby treatment and examination may be carried out with maximum speed and facility, and in which the possibility of the dog shifting position is inhibited.

Another object is to provide a table of the above type including support members for holding an animal in a desired position and yet leave a maximum area of the animal's body exposed for treatment.

A further object is to provide a veterinary holding table including support members which are readily adjustable both vertically and horizontally whereby the table may be easily adapted to hold different sized animals.

Still other objects of the invention are to provide a holding table for animals which may be economically manufactured, and which is extremely rugged in construction and yet may be easily operated.

These and other objects and advantages of the present invention are attained by providing a table having a horizontal guide means secured thereto and adapted to hold, in any desired horizontal position, one or more vertical support members. The vertical support members each include animal engaging means at their upper ends and vertical guiding means to enable vertical adjustment of the distance of the animal engaging means above the surface of the table. Preferably, the animal engaging means each include an arcuate band transversely affixed to a corresponding vertical support member, the concave portion of the band facing upwardly to engage the underside of the animal's body; for example, the chest portion of a dog. A flexible securing means, such as a chain or strap, is adapted to encircle the upper portion of the animal's body and be secured by the ends of the arcuate band. The arcuate bands may be of different sizes on the different vertical support members. For example, there may be a relatively small arcuate band to be used as a neck engaging portion, or a medium sized band to encircle an annimal's stomach portion.

Since the various animal engaging means are independently adjustable in vertical height above the surface of the table as well as horizontally adjustable along the horizontal guide means, the apparatus may be adapted to any sized animal for securely holding it in an upright position. By having the animal supporting portions extending upwardly from the control portion of the table to engage the underside of the animal, such as a dog, a rigid supporting means is provided which does not interfere with any operations performed on the dog with the exception of the immediate area engaged by the arcuate bands. Further, should the dog retract its legs, its body portion will nevertheless, remain in a fixed position; there is additionally, no tendency for the dog to swing as would be the case in prior art overhead harness structures.

A better understanding of the invention will be had by referring to a preferred embodiment thereof as illustrated in the accompanying drawings in which:

Figure 1 is a perspective view of a veterinary holding table in accordance with the invention;

Figure 2 is a cross section of one of the supporting members taken in the direction of the arrows 2—2 of Figure 1; and, Figure 3 is an enlarged view of an end portion of one of the animal engaging bands enclosed within the circular arrow 3 of Figure 1.

Referring to Figure 1, there is shown a table 10 provided along its central portion with an elongated horizontal guide means 11 adapted to support at desired horizontal positions a pair of vertical guide means 12 and 13. The vertical guide means include animal engaging means in the form of vertical rods 14 and 15 provided with transversely disposed arcuate band members 16 and 17. The concave side of the bands 16 and 17 face upwardly for engaging the under portion of the animal's body. A set of securing means in the form of chains 18 and 19 secured at corresponding ends of the two bands are adapted to encircle the animal's body and be coupled to the other ends of the bands as shown.

The vertical support members or rods 14 and 15 may be adjusted with respect to the table surface by moving the same through the vertical guide means and locking the rods in any desired position as by set screws 20 and 21. Similarly, the horizontal positions of the support members may be locked in any desired horizontal position by means of the set screws 22 and 23.

Figure 2 illustrates in detail the horizontal guiding track and the vertical guiding means 12. The vertical guide means 13 as well as any further vertical supporting means that may be provided, are identical to the guide means 12 and, therefore, description of one will suffice for all. Referring to Figure 2 the horizontal guide means 11 is shown in cross section as consisting of a pair of tracks 24 and 25 positioned in recesses 26 and 27 along the edges of an elongated slot S in the table 10. As shown, the tracks 24 and 25 each include downwardly extending track flanges 28 and 29 passing through the slot S.

The vertical guiding means 12 comprises a block 30 provided with a vertical central bore 31 and a pair of lateral flanges 32 and 33 adopted to ride on the tracks 24 and 25 respectively. The lateral flanges 32 and 33 include downwardly directed legs 34 and 35 passing through the slot S between the track flanges 28 and 29 as shown. The downwardly directed legs 34 and 35 extend beyond the ends of the track flanges and are provided with lateral projections 36 and 37 adapted to engage the underedge of the track flanges. By this arrangement, the vertical guiding means 12 is confined to movements in a horizontal direction along the horizontal guiding tracks. Further, because of the engagement of the tracks by the lateral flanges 32 and 33 and the lateral projections 36 and 37, any canting of the vertical rod 14 tending to tilt the block 12 will serve to bind the flanges on the track and prevent horizontal movement. Thus, with a dog secured in the vertical support means, and the vertical guide units adjusted at desired horizontal positions, it would be extremely difficult for motions of the dog to move the sliding vertical guides in a horizontal direction since such forces as could be exerted by the dog would be applied at the upper end of the vertical rods 14 and 15 and would be such as to tend to tilt the rods thereby binding the mechanism. Therefore, the set screws 22 and 23 are not always necessary, although they are desirable to prevent any possibility of accidental horizontal movement of the vertical guide means.

Referring now to Figure 3, the end portion of one of the arcuate bands 16 is shown as including a bifurcated end 38. By this construction the chain 18 of Figure 1 may be wedged between the bifurcated portions of the band so that the length between the fixed end of the chain and the end coupled to the bifurcated portion may be varied in accordance with the size of the animal being secured. To release the chain it is extremely simple to exert a slight downward motion and uncouple the chain link from the bifurcated portion.

In operation, the animal is placed on the table surface 10 and the vertical guide means 12 and 13 first horizontally adjusted so that the animal engaging portions or bands 16 and 17 may be positioned to engage, for example, the chest and stomach of the animal, respectively. The guiding blocks 12 and 13 are then locked in the desired horizontal positions, and the rods 14 and 15 adjusted vertically until the arcuate bands 16 and 17 engage the underside of the animal's body. The vertical rods are then locked in the bores 30 as by the set screws 20 and 21. The chains 18 and 19 are then passed around the animal's body and coupled to the bifurcated ends of the bands. The animal, such as a dog, for example, is held in an unright position with substantially the entire body exposed for washing or trimming treatments. There is no possibility of the animal collapsing should he lift up his legs inasmuch as the supports pass from under the animal and are rigid.

For another type operation, it might be desirable to use the smaller arcuate type band 17 as a neck band and the band 16 as a chest band as before. In such an instance an additional vertical support may be provided to support the hind end of the animal. The neck band 17 and co-operating chain 19 will then serve to hold the animal's head in a desired position. The entire structure is extremely simple to operate and is very rugged in construction. It is thus seen that the present invention provides an animal holding means which will not only serve to hold animals of different sizes in desired positions and prevent swinging of the animal should its legs leave the table surface, but additionally leaves a maximum portion of the animal's body exposed for treatment without interference.

Different arrangements as well as modifications of the holding means as fall within the scope and spirit of the present invention will occur to those skilled in the art. The holding table apparatus is, therefore, not to be thought of as limited to the specific embodiment chosen for illustrative purposes.

What is claimed is:

1. A veterinary table for supporting animals from their underside, comprising, in combination: a horizontal guide means including tracks positioned along the edges of an elongated slot running substantially along the center line of said table, said tracks having downwardly directed track flanges passing through said slot; vertical guide means including a block member having lateral flanges adapted to ride on the upper surface of said tracks and downwardly directed legs passing through said slots between said track flanges, and lateral projections secured to the lower edges of said legs to engage the under edges of said track flanges, whereby said block is confined to horizontal movements along said tracks and tilting movement thereof will bind said block in said tracks; and animal engaging means secured to said vertical guide means for engaging the underside of an animal.

2. An apparatus according to claim 1, in which said block member is provided with a vertical bore and said animal engaging means includes a vertical support rod passing through said bore; and set screw means in the side of said block adapted to engage said rod to lock said rod in a desired position in said bore.

3. An apparatus according to claim 2, including an arcuate band transversely secured to the upper end of said support rod, the concave portion of said arcuate band facing upwardly to engage the under portion of an animal; and securing means connected to one end of the band adapted to pass around the upper portion of said animal and be coupled to the other end of said band.

4. An elongated veterinary table for holding animals, comprising, in combination: a pair of horizontal tracks longitudinally secured to said table substantially midway between and parallel to the longitudinal edges of said table; animal support means including at least one vertical rod extending upwardly from said tracks and terminating at its upper end in an engaging means for supporting the underside of an animal; and a block member having lateral flanges adapted to ride on the upper surfaces of said tracks and having downwardly depending flanges extending between said tracks, said block including a vertical bore through which said rod passes; and means associated with said block adapted to bear against said rod to retain said animal engaging means at a desired level above said table.

References Cited in the file of this patent
UNITED STATES PATENTS

| | | |
|---|---|---|
| 266,016 | Cook | Oct. 17, 1882 |
| 1,109,772 | Leyh | Sept. 8, 1914 |
| 1,334,256 | Morgan | Mar. 16, 1920 |
| 1,357,415 | Olinger | Nov. 2, 1920 |